United States Patent
Elges

(10) Patent No.: US 6,484,434 B1
(45) Date of Patent: Nov. 26, 2002

(54) EMERGENT LIP FISHING LURE

(75) Inventor: Erick D. Elges, Wheaton, IL (US)

(73) Assignee: Erick Elges, Wheaton, IL (US)

( * ) Notice: Subject to any disclaimer, the term of this patent is extended or adjusted under 35 U.S.C. 154(b) by 0 days.

(21) Appl. No.: 09/723,431

(22) Filed: Nov. 27, 2000

Related U.S. Application Data

(63) Continuation-in-part of application No. 09/109,488, filed on Jul. 2, 1998.

(51) Int. Cl.[7] .............................................. A01K 85/00
(52) U.S. Cl. ...................................... 43/42.47; 43/42.39
(58) Field of Search .............................. 43/42.47, 42.22, 43/42.39, 42.45, 42.48

(56) References Cited

U.S. PATENT DOCUMENTS

| | | | | |
|---|---|---|---|---|
| 696,433 A | * | 4/1902 | Heddon | 43/42.47 |
| 1,333,154 A | * | 3/1920 | Buddle | 43/42.47 |
| 1,644,151 A | * | 10/1927 | Rodgers | 43/42.47 |
| 2,274,596 A | * | 2/1942 | Fink | 43/42.39 |
| 2,523,949 A | * | 9/1950 | Gambill | 43/42.47 |
| 2,608,016 A | * | 8/1952 | Shipley | 43/42.22 |
| 2,644,265 A | * | 7/1953 | Stettner | 43/42.39 |
| 2,685,145 A | * | 8/1954 | Dean | 43/42.39 |
| 2,775,839 A | * | 1/1957 | Kuslich | 43/42.47 |
| 2,875,549 A | * | 3/1959 | O'Sullivan | 43/42.22 |
| 3,729,850 A | * | 5/1973 | Waters, Jr. | 43/42.47 |
| 4,141,171 A | * | 2/1979 | Muddiman | 43/42.47 |
| 4,738,047 A | * | 4/1988 | Ryan | 43/42.47 |
| 5,115,592 A | * | 5/1992 | Renaud | 43/42.47 |
| 5,197,221 A | * | 3/1993 | Kresl | 43/42.47 |
| 5,216,830 A | * | 6/1993 | Brott, II | 43/42.39 |
| 5,937,569 A | * | 8/1999 | Solheim et al. | 43/42.47 |

FOREIGN PATENT DOCUMENTS

JP         10-108591 B1  *  4/1998

* cited by examiner

Primary Examiner—Darren W. Ark
(74) Attorney, Agent, or Firm—Michael B. Johannesen

(57) ABSTRACT

A fishing lure comprising a body having a nose, a tail and a horizontal center line. There is an emergent lip of an inverted trapezoidal shape attached to the body. The emergent lip is adjacent to the nose of the body at approximately a 45° angle to the centerline. The body of the lure includes one or more weights secured in cavities in the body, which causes the lure to sink in the water when at rest and retain the emergent lip up right when under water. The emergent lip causes the lure to rise in the water when the lure is pulled by fishing line attached to an eyelet on the nose of the body between the emergent lip and the centerline. A lure according to this invention further includes one or more eyelets on the body for attachment of fishhooks.

14 Claims, 3 Drawing Sheets

EMERGENT LIP FISHING LURE

CROSS REFERENCE TO RELATED DOCUMENTS

This patent application is a Continuation-In-Part of U.S. patent application Ser. No. 09/109,488, filed Jul. 2, 1998 which is the subject matter of Disclosure Document. No. 433100 filed in the United States Patent and Trademark Office on Mar. 26, 1998. It is respectfully requested that this document be retained beyond the two-year retention period so that it may be relied upon as evidence of the conception of the invention during the pendency of this application.

FIELD OF THE INVENTION

This invention relates to the field of fishing lures.

BACKGROUND OF THE INVENTION

A "diving plug" is a type of fishing lure that typically has a floating body and a single lip or planar surface protruding from the underside of the nose of its body. The lip is usually plastic or metal and often has an overlying eyelet to which a fishing line is attached. When at rest in the water the diving plug floats. When the diving plug is pulled through the water, the lip functions as a dive plane to cause the lure to submerge.

Often a lure with a new and unique movement not seen by fish before is extremely successful in attracting and catching fish. A fisherman, by properly manipulating the fishing rod and/or fishing line, can cause a conventional diving plug to dive, surface and wiggle in a manner intended to attract fish. The diving plug, however, is an intrusion into the water in its motion from the top of the water to the bottom of the water and thus can possibly scare fish when it intrudes down into the water.

SUMMARY OF THE INVENTION

A lure for use in fishing in water comprising a weighted body with a specific gravity greater than one having a nose, a tail, a midline and a horizontal center line. One or more weights are disposed in cavities in the body such that the center of gravity is below the centerline and in front of the midline. There is an emergent lip of an inverted trapezoidal shape attached to the body. The emergent lip is adjacent to the nose of the body at approximately a 45° angle to the centerline. The emergent lip causes the lure to rise in the water when the lure is pulled by fishing line attached to an eyelet on the nose of the body situated between the emergent lip and the centerline. The weights cause the lure of this invention to have a nose down tendency in the water when not pulled by the fishing line. A lure according to this invention further includes one or more eyelets on the body for attachment of fishhooks.

BRIEF DESCRIPTION OF DRAWINGS

A more complete understanding of this invention may be obtained from a consideration of the following detailed description in conjunction with the drawings, in which.

DETAILED DESCRIPTION

Figure 1:
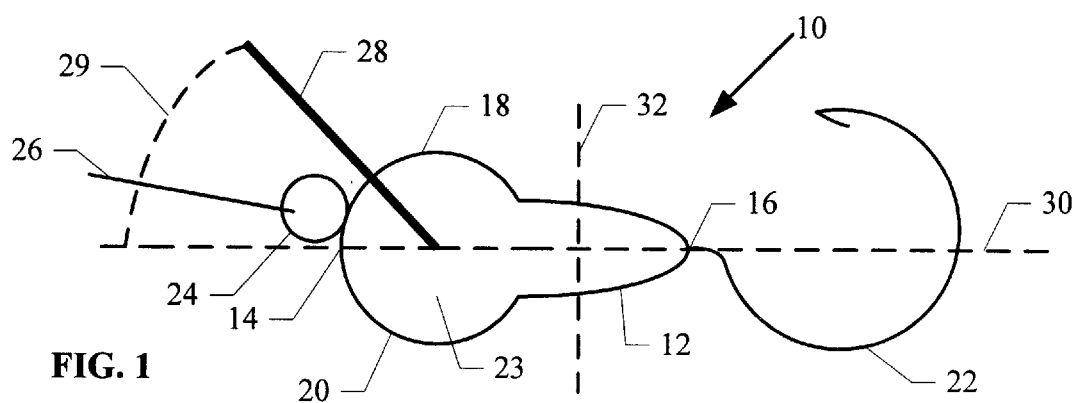
FIG. 1 is a side view of the emergent lip lure, according to one aspect of this invention.

FIG. 1 illustrates a side view of a fishing lure according to one exemplary embodiment of this invention in its most essential form, shown generally at 10. Emergent lip lure 10, according; to this exemplary embodiment, comprises a weighted jig body 12 having a nose 14, a tail 16, a topside 18 and a bottom side 20. The lure 10 includes a fishhook 22 attached to the tail 16. The weight of the jig body 12 is approximately ¼ ounce, giving lure 10 a specific gravity greater than one. The weight of jig body 12 is distributed so that the center of gravity is approximately at point 23. As a result, the lure 10 sinks or submerges nose first when at rest in the water and maintains topside 18 up and bottom side 20 down. An eyelet 24 is provided on the nose 14 of the jig body 12 for attachment of a fishing line 26.

An emergent lip 28 is attached to the nose 14 of the jig body 12 at or near the top 18. The emergent lip 28 is set at an angle of approximately 45° to a center line 30 of the jig body 12 configured to cause lure 10 to rise in the water when pulled or manipulated by the angler. The fishing line eyelet 24 is relocated from its customary jig location to a point between the emergent lip 28 and the nose 14 of the jig body 12, directly under the emergent lip 28. This location of the fishing line eyelet 24 tends to prevent the lure of this invention from rolling over in the water when the lure is pulled.

Figure 2:
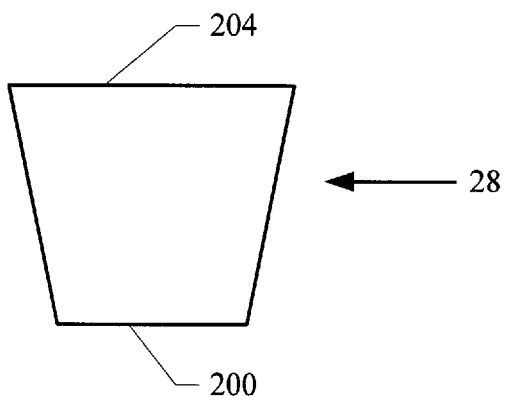
FIG. 2 is a frontal view of the emergent lip of FIG. 1.

Turning to FIG. 2, a front view of an emergent lip 28 as used on the weighted jig 10 of FIG. 1 is shown. The emergent lip 28 may be coupled to the topside of the lure body 12 at a variety of angles, typically in the range of 20 to 70 degrees to center line 30. An increase in the angle of lip 28 results in lure 10 ascending at faster rate. In fishing parlance, component 28 is known by many names such as a tip, vane, spoon, deflector, plane or lip. Generally, the lip 28 is made of a clear plastic or similar material so as to be invisible to fish in the water.

The emergent lip (or planar element) 28 is coupled to the topside 18 of the nose 14 of the lure body 10. The shape of the lip 28 is substantially trapezoidal. The shorter 200 of the two parallel sides 200, 204 of the trapezoidal lip 28 should be approximately the same length of the width of the lure body 10. The shorter parallel side 200 of the lip 28 is coupled to the lure body 12. The longer parallel side 204 of the lip 28 should be one and a half to two times the length of the shorter side. Of course, other lip shapes may be used with varying lure action results. This emergent lip 28 is approximately ⅜ inches high, with the two parallel sides: 204, 200 measuring ¾ inches and ⅜ inches, respectively.

Figure 3:
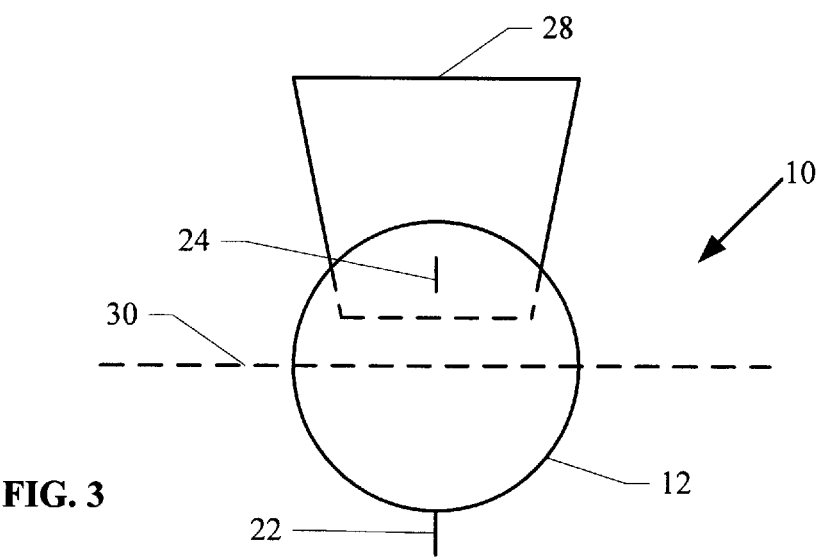
FIG. 3 is a frontal view of the emergent lip lure of FIG. 1.

FIG. 3 illustrates a frontal view of the weighted jig 10. In this exemplary embodiment, the emergent lip 28 is inserted into the weighted jig body 12 up to the centerline 30. The position of the eyelet 24 for attachment of fishing line is between the centerline 30 and the emergent lip 28. Of course, other configurations of the eyelet 24 and the emergent lip 28 may be utilized.

When lure 10 is in this basic jig form, an angler may place a grub or similar bait on hook 22. Also, the angler may put a minnow, nightcrawler or other live bait on hook 22. This exemplary form of lure 10 is advantageous for many reasons. Anglers using jigs are usually targeting bottom-feeding fish. With a typical prior art jig, the bait rises very little in the water when retrieved after casting. The emergent lip 28 increases the vertical rise of lure 10 and provides a "swimming" action when retrieved from a distance.

Figure 4:
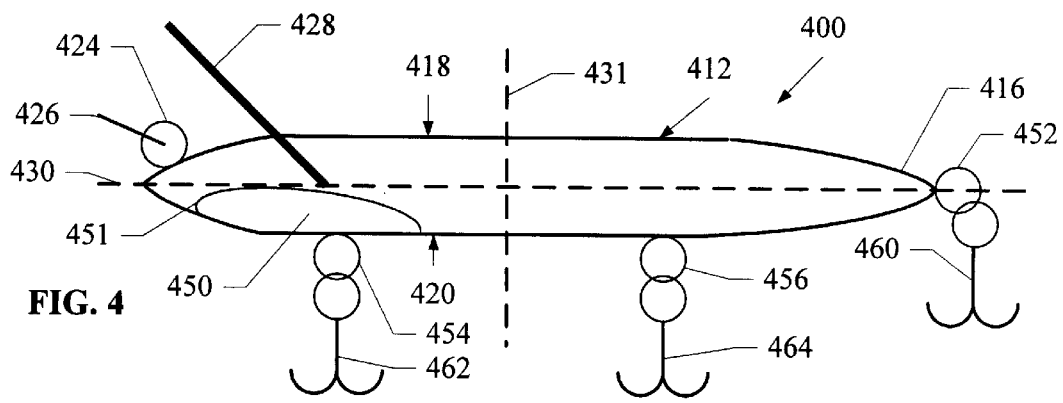
FIG. 4 is a side view of another exemplary embodiment of the emergent lip lure of this invention.

Turning now to FIG. 4, another exemplary embodiment of an emergent lip fishing lure is shown generally at 400. FIG. 4 illustrates an emergent lip lure 400 with an essentially square body 412 having a height and width of approximately ⅞ inches, respectively, and having a nose 414, a tail 416, a topside 418 and a bottom side 420. In this exemplary embodiment, the body 412 is composed of bass wood, but may also be composed of rubber, plastic, or similar material, as will be discussed further, below. The emergent lip 428 is set at an angle of 45° from a center line 430, which is substantially co-planar with the top 418 of the lure body 412. Mid line 431 shows the mid point of the length of the body 412 of lure 400. In order to cause the emergent lip lure 400 to sink, a weight 450 is positioned in a cavity 451 in the underside of the nose 414 of the lure body 412, giving the lure of FIG. 4 a specific gravity greater than one. Such placement of the weight 450 below the centerline 430 and in front of mid line 431 causes the lure body 412 to sink nose first when not pulled in the water, to maintain the emergent lip 428 above the body 412 and also work cooperatively with the emergent lip 428 to produce a "swimming" or "wiggling" motion when pulled through the water.

In this exemplary embodiment, an eyelet 424 for attachment of a fishing line 426 is provided on the nose 414 of the fishing lure body 412, generally between the emergent lip 428 and the tip of the nose 414. A hook eyelet 452 is provided at the tail 416 of lure body 412, and, advantageously, other hook eyelets 454, 456 are provided along the underside of the lure body (two in this exemplary embodiment). The hook eyelets 452, 454 and 456 retain hooks 460, 462 and 464 respectively. Hooks 460, 462 and 464 are treble hooks in this exemplary embodiment. Of course, other types of fishhooks may be used without departing from the teachings of this invention.

Figure 5:
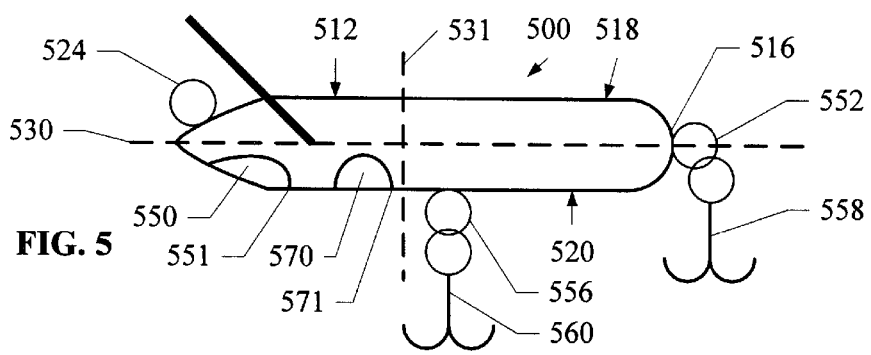
FIG. 5 is a side view of still another exemplary embodiment of the emergent lip lure of this invention.

FIG. 5 illustrates a side view of an emergent lip lure according to a further exemplary embodiment of this invention, shown generally at 500. In FIG. 5, the lure body 512 is essentially rectangular, with its width being greater than its height. The lure body 512 includes a nose 514, a tail 516, a topside 518 and a bottom side 520. The emergent lip 528 of this embodiment is also set at 45 degrees from the centerline 530. The middle of the body 512 is at mid line 531. Two-thirds of total lead weight 550 is positioned in the underside of the nose section of lure body 500 in a first cavity 551. The remaining one-third of lead weight 570 is centered in the underside of the lure body 512 in a second cavity 571 approximately one-third of the total length of the lure body 512 back from the head 514 and in front of mid line 531. There are two hook eyelets 552, 556 holding two hooks, 558, 560, respectively. This design produces the same resultant action as the lure 300 of FIG. 3, except that it produces a wider zigzag action when the angler keeps the rod tip close to the water and continuously reels lure 500 across the surface.

Figure 6:
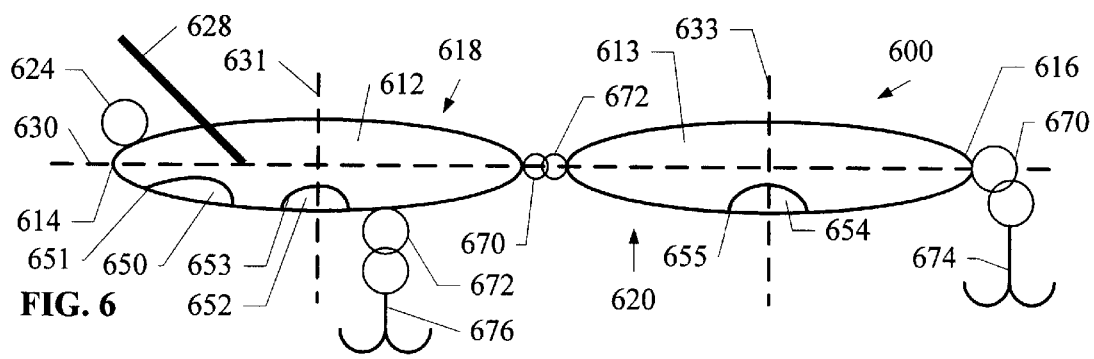
FIG. 6 is a side view of yet another exemplary embodiment of the emergent lip lure of this invention.

FIG. 6 illustrates a further embodiment of an emergent lip lure according to this invention, shown generally at 600. This embodiment has a jointed body 612, 613. Lure body is divided into two pieces; 612, 613 and connected by interlocking eyelets 670, 672. Lure body includes a nose 614, a tail 616, a topside 618 and a bottom side 620. A fishing line eyelet 624 is attached to the front piece 612 of the body. The emergent lip 628 of this embodiment is attached to the nose 614 of the front piece 612 above centerline 630 and in front of mid line 631. Three-quarters of weight 650 is positioned in a first cavity 651 in the underside of the nose 614 of first lure body piece 612. One-eighth of the weight 652 is positioned in a second cavity 653 in the underside of the front lure body piece 612, approximately at mid line 631. The final one-eighth of the weight 654 is positioned in a cavity 655 in the underside of the second piece of lure body 613 approximately at the mid line 656 of the second lure body piece 613. This lure also includes two hook eyelets 670, 672, which hold fish hooks 674, 676. This design produces the same action as the lure 300 shown in FIG. 3 when reeled towards the angler. However, due to its jointed construction, it has an enhanced swimming action when retrieved.

Figure 7:
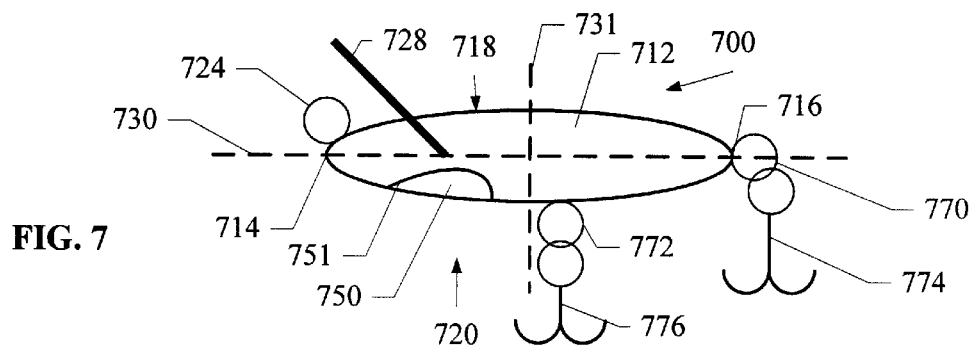
FIG. 7 is a side view of another exemplary embodiment of the emergent lip lure of this invention.

FIG. 7 illustrates a further embodiment of this invention, shown generally at 700. This exemplary embodiment has an oval-shaped body 712 when viewed from the side. Lure body includes a nose 714, a tail 716, a topside 718 and a bottom side 720. A fishing line eyelet 724 is attached to the, nose 714 of the body 712. The emergent lip 728 of this embodiment is attached to the nose 714 of the body 712, above centerline 730 and in front of mid line 731 as in the other embodiments. Weight 750 is positioned in a cavity 751 in the underside of the lure body 712 at a distance from the head of lure body 712 approximately one-third of its overall length. This lure also includes two hook eyelets 770, 772, which hold fish hooks 774, 776. The lure 700 of this exemplary embodiment offers one major advantage when used underwater. Unlike the other embodiments of this invention, this exemplary embodiment pulsates while falling in the water as well as while it is being retrieved. When submerged, this lure 700 is constantly in motion, except when lying on the bottom of a water body. This embodiment, when operating as a surface lure, does not zigzag or "walk the dog". It does, however, operate as a surface popper.

Figure 8:
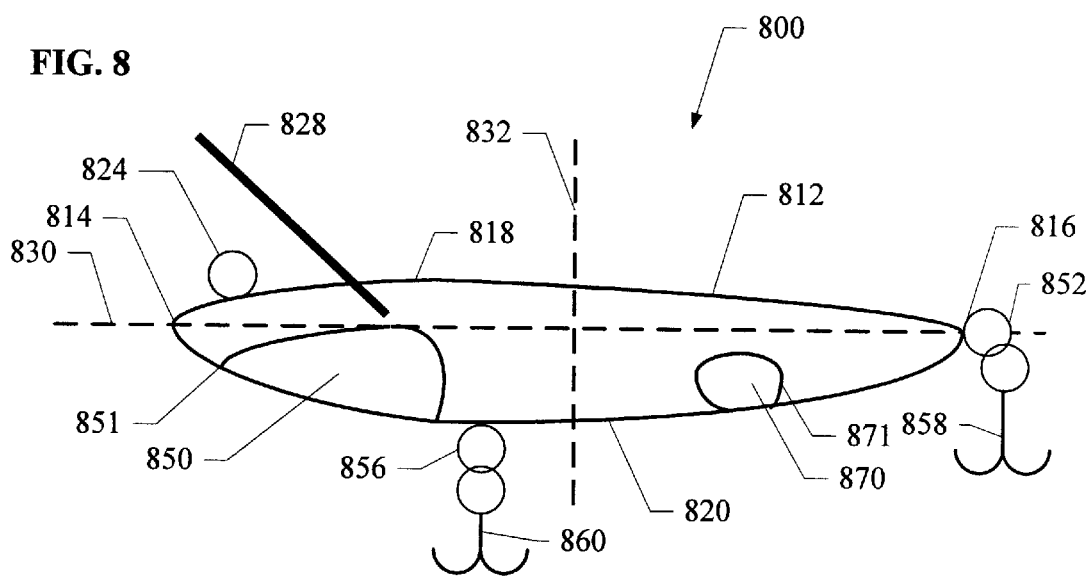
FIG. 8 is a side view of a first ovoid exemplary embodiment of the emergent lip lure of this invention.

FIG. 8 illustrates a further embodiment of this invention, shown generally at 800. This exemplary embodiment has a substantially oval-shaped body 812 when viewed from the side. Lure body 812 includes a nose 814, a tail 816, a topside 815 and a bottom side 820. Lure body 812 is approximately 2¾ inches in length and approximately ½ of an inch in width. A fishing line eyelet 824 is attached between nose 814 and emergent lip 826. The emergent lip 828 is attached to the topside 818 of lure body 812 approximately ½ of an inch back from nose 814. The emergent lip 828 of this embodiment is set approximately 32 degrees from centerline 830. Sixty-five percent of total lead weight 850 is positioned in a first cavity 851 under nose 812 and in front of mid line 831. The remaining thirty-five percent of lead weight 870 is centered in a second cavity 852 in the underside of lure body 812 approximately three quarters of the total length of lure body 812 back from lure nose 814. There are two hook eyelets 852, 856 holding two hooks 858, 860. This design produces an action similar to lure 500 of FIG. 5 except it falls with a lesser nose down incline and runs just under the surface of a body of water (about 4 to 5 inches below the surface) when retrieved in a slow manner.

Figure 9:
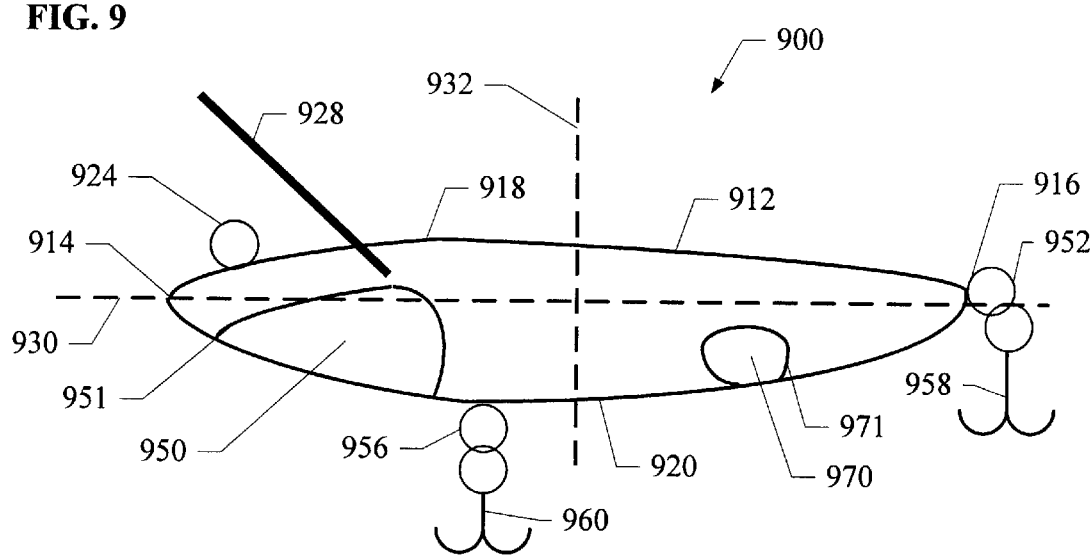
FIG. 9 is a side view of a second ovoid exemplary embodiment of the emergent lip lure of this invention.

FIG. 9 illustrates a further embodiment of this invention, shown generally at 900. This exemplary embodiment has a substantially oval-shaped body 912 when viewed from the side. Lure body 912 includes a nose 914, a tail 916, a topside 915 and a bottom side 920. Lure body 912 is 2¼ inches in length and approximately ½ of an inch in width. A fishing line eyelet 924 is attached between nose 914 and emergent lip 928. The emergent lip 928 is attached to the topside 918 of lure body 912 approximately ⅜ inch back from nose 914. The emergent lip 928 of this embodiment is set at an angle of approximately 30 degrees from centerline 930. Sixty-nine percent of total lead weight 250 is positioned in a first cavity 951 in the underside of the nose section of lure body 912 in front of mid line 931. The remaining thirty-one percent of lead weight 970 is centered in a second cavity 952 in the underside of lure body 912 approximately three quarters of the total length of lure body 912 back from lure nose 914 behind mid line 931. There are two hook eyelets 952, 956 holding two hooks 958, 960. This design produces an action similar to lure 800 of FIG. 8.

All of the exemplary embodiments of my emergent lip lure are designed to sink (i.e., have a specific gravity greater than 1) and are made from wood or any other suitable material, including but limited to, plastic, metal, and rubber with one or more cavities for weights. Other lure bodies with similar buoyancy characteristics may of course be used. The key component of my lure is the lip or planar element. The lip is placed on the topside of the head section and set at an angle to the body which makes the lure ascend in the water (after submerging) and then is drawn forward by the fishing line and also aids in producing surface action.

The exemplary embodiments shown in FIGS. 4–7 depict lure bodies that are constructed of basswood and the exemplary embodiments of FIGS. 8 and 9 are balsa wood. Basswood and balsawood are buoyant and require one or more weights to be added to lure body. The amount of weight required is based on the amount of basswood or balsa wood in lure body, and the weight of line attachment eye, lip, hook attachment eyes, and hooks. In the case of, basswood, the total weight of the components should typically be 1.1 to 1.2 times the weight of the basswood lure body. If 29.63 grams of basswood are being used in the:lure body, then the total weight of additional components should be between 32.59 (29.63×1.1) and 35.55 grams (29.63×1.2). If the combined weight of components is 13.21 grams, then the amount of weight required may be determined by subtraction. The amount of lead weight required is between 19.38 (32.59–13.21) and 22.34 (35.55–13.21) grams. The weights are inserted into cavities drilled or carved into the wood such that, when the weight is inserted, the emergent lip remains upright. Weight requirements differ due to variations in wood density. Any increase in the amount of weight used results in lure falling in the water at a faster rate. The emergent lip lure should fall at a rate of approximately one-foot per second or a similar rate.

In all of the examples shown in FIGS. 3–7, the line attachment eyes are cotter pins ranging in size from ¹⁄₁₆×½ to ¹⁄₁₆×¾. In FIGS. 8 and 9, the eyes are size 217½ screw eyes. Those familiar with the art recognize that these attachments and may be screw eyes, a single length of wire attached or otherwise fastened to the lure body or from a variety of similar functioning components. Hooks that are attached to hook attachment eyes can be of a variety of shapes and sizes.

With the components of the emergent lip lure placed according to these exemplary embodiments, the lure dives headfirst when cast, with little or no resultant motion (lure action). Once submerged, when the angler begins to retrieve the lure, the emergent lip causes the lure to rise toward the surface of the water. As it rises, the lure will pulsate to and fro producing a swimming-like action. If retrieval stops, the lure once again dives nose first towards the bottom of the water, again with little to no resultant lure action.

If the angler retrieves this lure in a continuous manner, it eventually breaks the surface of the water. Once on the surface, if the angler keeps the tip of the fishing rod down and close to the water while continuously reeling, the emergent lip lure zigzags across the surface of the water. If the angler keeps the rod tip high in the air while reeling, the lure follows a straight path toward the angler while spraying water off of lip in a forward direction from lure. If the angler keeps the rod tip high, continuously reels and provides short jerking actions of the rod tip, emergent lip lure operates as a surface "popper".

It is to be understood that the above-described embodiment is to illustrate the principles of this invention, and that those skilled in the art may devise many variations without departing from the scope of the invention. It is, therefore, intended that such variations be included within the scope of the appended claims.

I claim:

1. A fishing lure consisting of:
   a body having a nose, a tail, and a topside and a bottom side;
   a weight secured in a cavity in the bottom side near the nose of the body disposed in said body so that said emergent lip remains on top when said lure is in the water and said lure sinks in the water when said lure is at rest;
   an eyelet attached to the body for attachment of a fishing line; and
   an emergent lip attached on the topside near the nose of the body, said lip being substantially flat, having a shape that is substantially an inverted trapezoid and attached to said body at an angle to the topside selected to cause the lure to rise towards the water's surface and make a swimming motion when the lure is pulled forwardly at the eyelet.

2. A lure according to claim 1 wherein said eyelet is attached to the body of the lure between the nose and the emergent lip.

3. A lure according to claim 1 wherein said body includes a fish hook at the tail of the body.

4. A lure according to claim 1 further comprising an eyelet at the tail of said body for attachment of a fishhook.

5. A lure according to claim 1 wherein the lip has first and second parallel sides, wherein the first side is wider than the second side, wherein the body of said lure is configured to receive said second side of said lip and wherein the first side is approximately ¾ of an inch wide, the second side is approximately ⅜ of an inch wide, and the lip is approximately ⅜ of an inch high.

6. A lure according to claim 1 further including a horizontal centerline, wherein said emergent lip is attached at an angle of approximately 45° from the centerline.

7. A lure according to claim 1 further including a horizontal centerline, wherein said emergent lip is attached at an angle to the centerline selected from angles between the angles of 20° and 70°, inclusive.

8. A fishing lure according to claim 1 wherein said body is essentially rectangular.

9. A fishing lure according to claim 1 further including at least one eyelet for attachment of a fishing hook.

10. A fishing lure according to claim 1 wherein said body is elongated from said nose to tail.

11. A fishing lure according to claim 1 wherein said body further includes a mid line, and said weight comprises a plurality of weights, a first of said weights being secured in said cavity near said nose and a second of said plurality of weights being secured in another cavity near said mid line.

12. A fishing lure according to claim 11, wherein said second of said plurality of weights is secured in said second cavity at said mid line.

13. A fishing lure according to claim 11 wherein said second of said plurality of weights is secured in said second cavity behind said mid line.

14. A fishing lure according to claim 1 wherein said weight comprises a plurality of weights, and wherein said plurality of weights are disposed in said body so that said emergent lip remains on top when submerged in the water.

* * * * *